March 7, 1950  F. J. STOKES, JR., ET AL  2,499,980
PRESS FOR MOLDING ANNULAR STEPPED ARTICLES
Filed Jan. 7, 1944  3 Sheets-Sheet 1

Inventor
FRANCIS J. STOKES, JR.
LAWRENCE H. BAILEY

By Ralph B. Stewart
Attorney

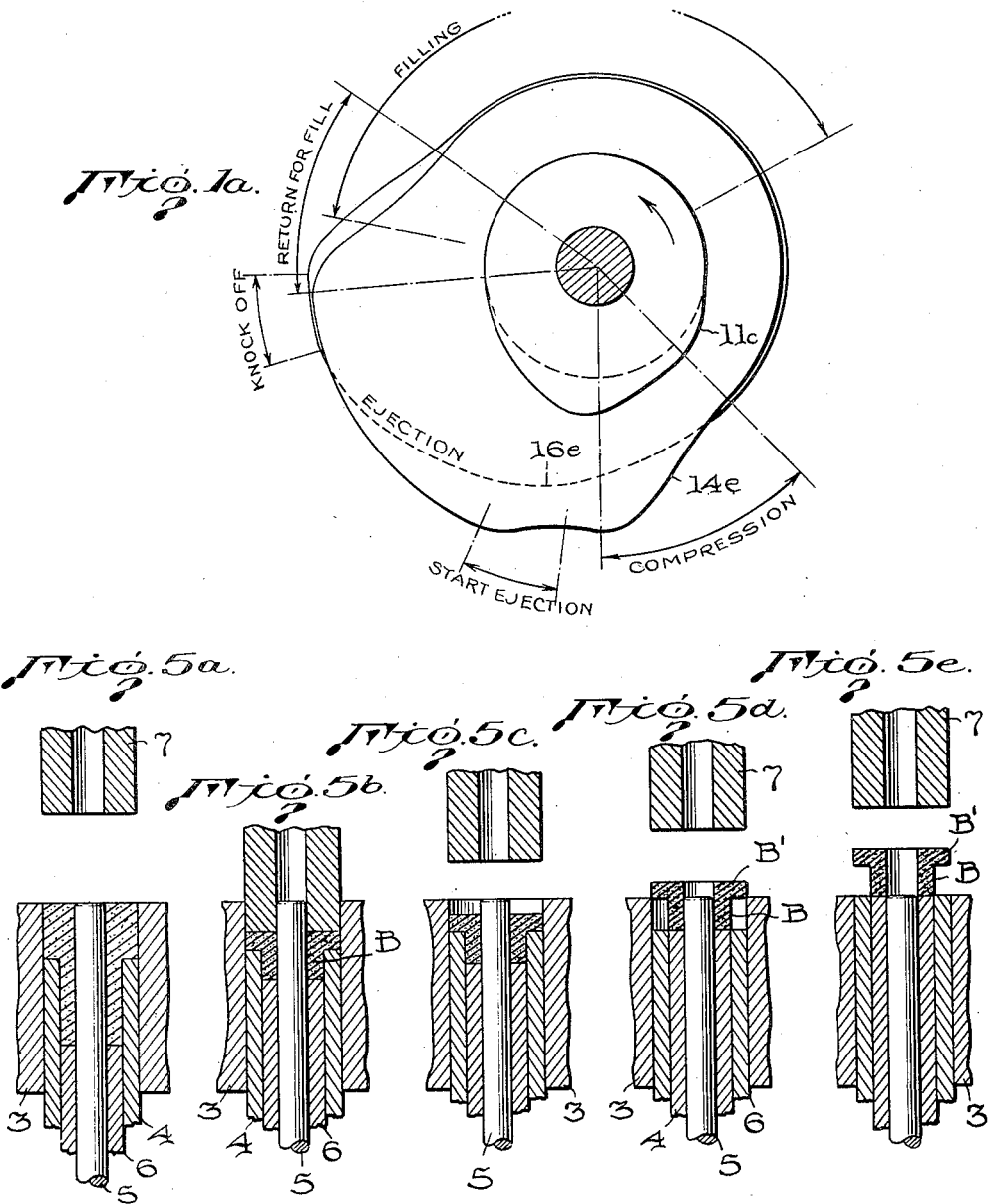

March 7, 1950     F. J. STOKES, JR., ET AL     2,499,980
PRESS FOR MOLDING ANNULAR STEPPED ARTICLES
Filed Jan. 7, 1944     3 Sheets-Sheet 3
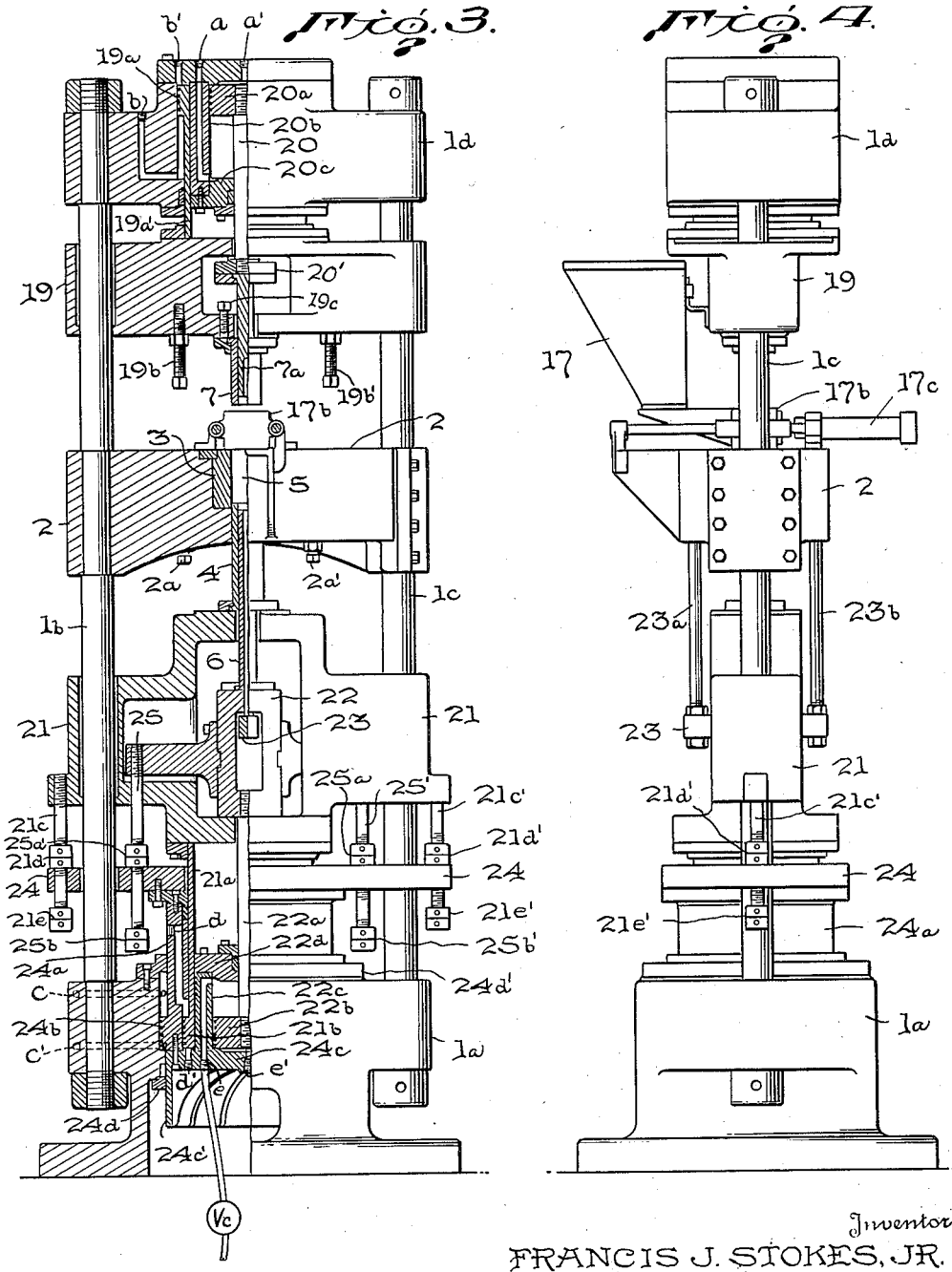
Inventor
FRANCIS J. STOKES, JR.
LAWRENCE H. BAILEY
By Ralph B. Stewart
Attorney Patented Mar. 7, 1950

2,499,980

UNITED STATES PATENT OFFICE 2,499,980

PRESS FOR MOLDING ANNULAR STEPPED ARTICLES

Francis J. Stokes, Jr., Philadelphia, and Lawrence H. Bailey, Cheltenham, Pa., assignors to F. J. Stokes Machine Company, a corporation of Pennsylvania Application January 7, 1944, Serial No. 517,462

11 Claims. (Cl. 18—16)

This invention relates to molding presses, and it is concerned especially with the problem of ejecting the molded article from the press after it has been formed under pressure.

The present invention is especially useful in presses employed for forming compressed articles from powdered or granular material such as ceramics, carbon, metal and the like, although it is not limited to this field of application.

When forming molded articles by compressing powdered or granular material under heavy pressure to form the article, one important problem is that of ejecting the article from the mold cavity. This is due to the large amount of friction developed between the surfaces of the formed article and the surrounding walls of the die or mold cavity. If the molded article is not properly supported at the time of ejection from the die, pieces of the article will break away or the article may be destroyed entirely by cracking. This difficulty is greatly increased where the molded article is not of simple shape but has different levels in the different parts thereof.

In the formation of compressed articles having complicated shapes, such as bushings having different diameters along different linear portions, it is necessary to employ two or more lower punches or plungers which are independently operated during compression in order to secure proper density of the material throughout the article. Where the separate punches are operated by individual cams or other devices it is difficult to adjust the operation of the separate devices so that the article will not be chipped upon being ejected from the die. This difficulty is overcome in the present invention by providing operating devices for moving the different plungers through different distances during compression, and then providing a common operating device for moving all of the plungers in fixed relation during the initial stage of ejection. In this way, all plungers are moved simultaneously and since the molded article is supported uniformly throughout its entire area, while frictional contact is being broken, there is no substantial tendency for the article to chip or to crack. In the final stage of ejection the plungers are leveled off so their ends are flush with the upper surface of the die table.

Two embodiments of our invention are illustrated in the accompanying drawing in which Figure 1 is a front view showing one form of the invention in which the plungers are operated by cam devices;

Figure 1a illustrates the contours for three cams of the machine shown in Figures 1 and 2;

Figure 3 shows a second form of the invention in which the plungers are operated by hydraulic cylinders, the right half of the figure being shown in front elevation and the left half in vertical section;

Figure 4 is a side view of the press illustrated in Figure 3; and

Figures 1, 2:
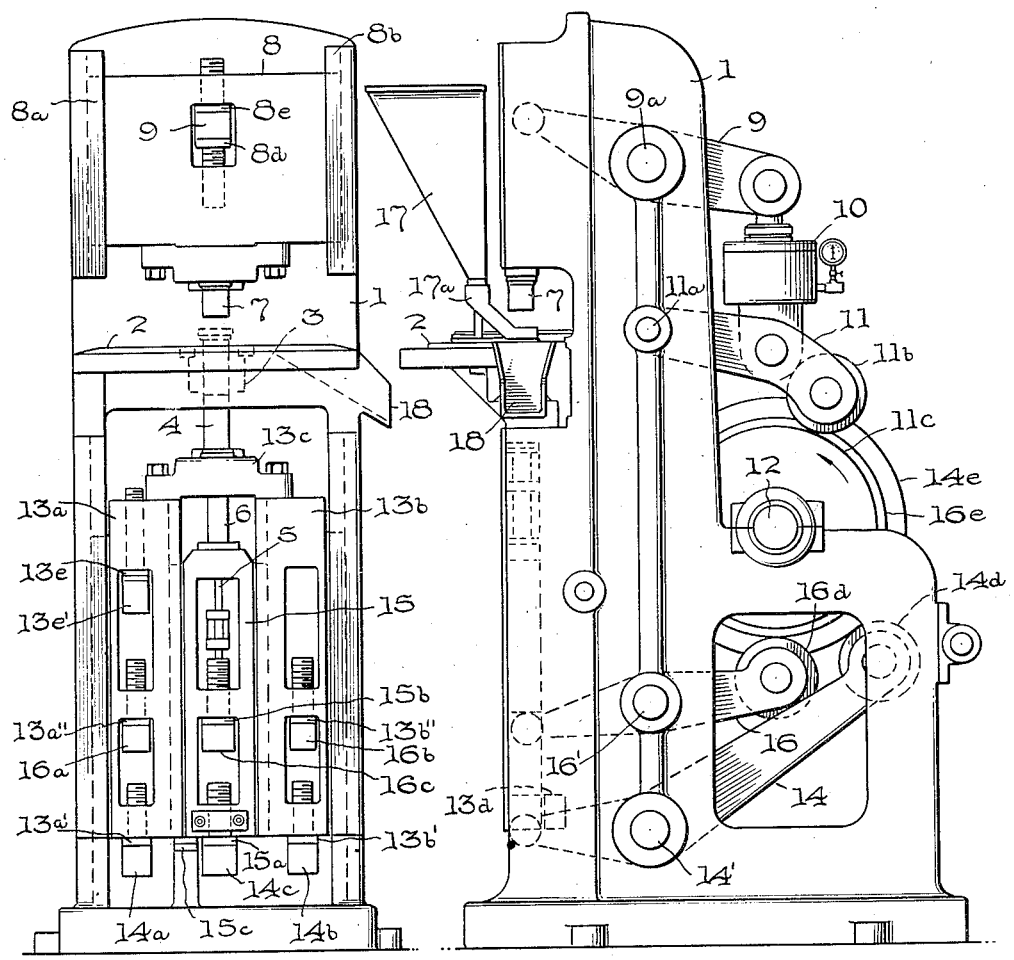
Figure 2 is a side view of Figure 1.

Figures 5a to 5e, inclusive, illustrate the various stages in the operation of the lower plungers.

Referring to the drawing, the press illustrated in Figures 1 and 2 comprises a main frame 1 provided with a table 2 which supports a die 3 in which the molded article is to be formed. This die may have different shapes, but for the purpose of illustration it comprises a cylindrical element having a vertical cylindrical die cavity open at the top and at the bottom. For the formation of a flanged bushing as shown at B in Figure 5d, the die 3 forms the outer cylindrical surface of the flange B', and the outer cylindrical surface of the bushing is formed by the inner surface of a hollow plunger 4 inserted into the die cavity from below. The inner surface of the bushing is formed by a core-rod 5 mounted at the center of the die and the rear face of the bushing is formed by a second sleeve-like plunger 6 surrounding the core-rod. The flanged face of the bushing is formed by a tubular plunger 7 which enters the upper end of the die cavity.

Upper plunger 7 is carried by a slide 8 mounted for vertical reciprocation between two parallel guides 8a and 8b carried by frame 1. Slide 8 is reciprocated by means of a lever 9 pivoted to frame 1 at 9a and having the forward end thereof entering between adjustable abutments 8c and 8d carried by slide 8. These abutments may be formed of disk elements provided with stems having threaded connection with slide 8. The rear end of lever 9 is connected through a suitable compression link 10 to a second lever 11 pivoted to the frame 1 at 11a and carrying a cam follower 11b which engages an operating cam represented by the circle 11c in Figure 2. Cam 11c is mounted upon and driven by cam shaft 12 and is provided with a contour suitable for operating the upper plunger in timed relation with the other plungers as will be described hereinafter.

Lower plunger 4 is carried by a vertically reciprocating slide mounted between two guides provided on the lower front portion of frame 1. The slide is formed of two side members 13a and 13b joined at the top by a yoke piece 13c which carries the plunger 4, and also joined at the lower ends by a bridging portion 13d shown in dotted lines in Figure 2. This slide is reciprocated on the compression stroke by means of a lever 14 pivoted to frame 1 at 14' and having two arms 14a and 14b extending forwardly from the pivot point and positioned under adjustable abutments 13a' and 13b' carried by slide parts 13a and 13b.

Mounted between slide parts 13a and 13b is a third slide 15 which carries inner tubular plunger 6. Slide 15 is moved vertically on the compression stroke by means of a third arm 14c on lever 14 which engages the adjustable abutment 15a at the lower end of the slide 15. The rear end of lever 14 is provided with a cam follower 14d which engages an operating cam represented by the circle 14e in Figure 2.

The core rod 5 mounted within plunger 6 extends downwardly through the upper end of slide 15 and into an opening formed in this slide as shown in Figure 1. The lower end of the core rod may be supported in fixed relation with the die 3, or it may be mounted for vertical reciprocation by means of a suitable cam-operated lever, as desired.

A fourth cam operated lever 16 (the ejection lever) is pivotally supported on frame 1 at 16' and is provided with three forwardly extending arms, two of which, 16a and 16b, enter openings formed in slide parts 13a and 13b and engage adjustable abutments 13a'' and 13b'' carried by these parts. A third forwardly extending arm 16c on lever 16 enters an opening in slide 15 and engages an adjustable abutment 15b carried by this slide. The rear end of lever 16 is provided with a cam follower 16d which engages a suitably shaped cam represented by the circle 16e in Figure 2.

The lowermost position of the slide carrying lower plunger 4 may be adjusted by adjustment of abutment 13e which engages a fixed abutment 13e' carried by the frame 1. In a like manner, the lowermost position of inner plunger 6 is determined by adjustment of abutment 15c which has threaded engagement with the base of frame 1 and engages the lower end of slide 15. Adjustment of abutments 13e and 15c determines the amount of material which may be placed in the mold cavity during loading, and thereby determines the ultimate weight of the molded article.

Abutments 13a', 13b', and 15a, which cooperate with compression lever 14, are adjusted to determine the final shape of the article. In other words, these abutments determine the levels which are attained by the upper ends of lower plungers 4 and 6 at the end of the compression stroke. The cam which operates lever 14 is also provided with a raised portion following the compression stroke portion for the purpose of forcing both plungers 4 and 6 upwardly to break the frictional lock between the molded article and the die 3 and to initiate the ejection of the molded article from the die cavity. The ejecting operation is completed by lever 16 which has a cam of proper contour to continue the upward movement of plungers 4 and 6 after the initial friction has been broken by compression lever 14. Abutments 13a'', 13b'' and 15b are adjusted so that ejection lever 16 first raises plunger 6 to the level of plunger 4, as shown in Figure 5d, and then moves both plungers upwardly. When lever 16 reaches its point of highest movement of plungers 4 and 6, the upper ends of these plungers are positioned in the plane of the upper face of die 3, as shown in Figure 5e.

The die cavity may be filled or loaded with molding material by any suitable loading device such as that represented in Figure 2 and comprising a hopper 17 having its outlet communicating with an oscillating shoe 17a which is oscillated in known manner by a suitable cam device to supply a molding charge to the die cavity when the upper plunger is withdrawn therefrom.

Operation of the press shown in Figures 1 and 2 is as follows: It will be understood that the various abutments have been adjusted to provide the proper weight of the molded article, and the relative positions of plungers 4 and 6 during the filling or loading operation are shown in Figure 5a. Typical outlines for compression cams 11c and 14e, and for ejection cam 16e, are shown by the solid line curves 11c and 14e and by the dotted curve 16e, respectively, in Figure 1a. The mold cavity is filled during the angular movement of the cams marked "Filling." After the loading shoe has been removed from over the cavity, the upper plunger 7 is driven downwardly while lower plungers 4 and 6 are moved upwardly by compression lever 14, the final positions of the various plungers being represented in Figure 5b. The compression stage is shown by the angular portion "Compression" in Figure 1a. It will be noted that during the compression stroke the plungers 4 and 6 do not maintain their same relative position, since it is necessary to move plunger 6 a greater distance than plunger 4 in order to secure uniform density throughout the molded article. In other words, arm 14c of compression lever 14 first engages abutment 15a on slide 15 and drives plunger 6 upwardly into proper position with respect to plunger 4 before arms 14a and 14b of lever 14 engage abutments 13a and 13b' on slide 13 carrying plunger 4. The order of operation of plungers 4 and 6 is determined by the relative positions of adjustable abutments 15a, 13a' and 13b'. After arms 14a and 14b engage abutments 13a' and 13b' both plungers are driven upwardly in fixed relation to the position shown in Figure 5b. Following compression, the upper plunger 7 is first withdrawn from the cavity, and then the raised portion on cam 14e (see angular portion "Start ejection" in Figure 1a) causes further movement of compression lever 14 to move plungers 4 and 6 upwardly while maintaining the same relative positions of these two plungers, and this additional upward movement is for the purpose of breaking the frictional contact between the molded article and the engaging surfaces of the die 3 and the core rod 5. This step in the operation is represented by the angular portion of Figure 1a marked "Start ejection," see also Figure 5c. In the final stage of ejection, arm 16c of lever 16 first comes into contact with abutment 15b on slide 15 and forces inner plunger 6 upwardly so that the end of this plunger lies within the same plane as the end of plunger 4 (Figure 5d), and then arms 16a and 16b of lever 16 engage abutments 13a'' and 13b'', and thereafter lever 16 continues to force both plungers upwardly until the ends of these two plungers lie in the same plane as the upper face of die 3, as shown in Figure 5e. Following this, the loading shoe is oscillated into position over the cavity and it sweeps the molded bushing B to one side and into the discharge shoe 18 (see "Knock off" stage in Figure 1). In the next stage as shown in Figure 1a, levers 14 and 16 are operated to permit plungers 4 and 6 to be withdrawn to the initial loading position shown in Figure 5a, and a new cycle begins.

The ejecting portion of compression cam 14e may be formed as a removal insert, and by providing a number of inserts of various heights, it is possible to vary the amount of ejection done by the cam 14e in relation to the total ejection stroke.

It is obvious that the ejecting portion of compression cam 14e may be designed to move plunger 4 to its final position with the end thereof flush with the top of table 2, and ejection cam 16e would serve only to level plunger 6, but this would require accurate machining of cam 14e and the cam could be used for only one article. By leveling both plungers from cam 16e, a greater range of sizes of articles may be formed with the same set of cams.

In Figures 3 and 4, we have illustrated the second form of the invention in which various plungers are operated by hydraulic cylinders which are controlled in timed relation by well known means to produce any desired sequence of operation.

In this arrangement, the main frame consists of a base 1a supporting two tension rods 1b and 1c which support an upper crosshead 1d. The die table 2 is supported on rods 1b and 1c in a fixed position and supports the die ring 3. The upper plunger 7 is carried by a sliding crosshead 19 which is guided by rods 1b and 1c and reciprocated vertically by means of an annular piston 19a positioned in a cylinder formed in crosshead 1d. The crosshead 19 is supported from piston 19a by a sleeve extension 19a'. In the modification shown in Figure 3, an additional upper tubular plunger 7a is positioned within the plunger 7 for the purpose of forming a bushing having a step on the upper face as well as on the lower face. This plunger is connected by a suitable coupling 20' to the end of a piston rod 20 of piston 20a which is positioned within a cylinder 20b arranged concentrically within the annular piston 19a. The lower end of cylinder 20b is provided with a cylinder head 20c.

Lower plunger 4 is carried by sliding crosshead 21 which is guided by rods 1b and 1c and supported upon sleeve 21a forming an extension of an annular piston 21b which is positioned within base 1a. The inner tubular plunger 6 is carried by a suitable coupling head or yoke 22 mounted at the upper end of piston rod 22a which is connected with piston 22b positioned within the cylinder 22c arranged concentrically with annular piston 21b in the base 1a. The core rod 5 is supported at its lower end by a bar 23 which passes through a vertical slot in the connection head 22 and is supported at its outer ends by rods 23a and 23b having their upper ends secured to table 2.

A movable crosshead 24 is positioned below the crosshead 21 and is supported on a sleeve 24a which forms an extension of ejection piston 24b positioned within a cylinder formed directly in base 1a. Ejection piston 24b forms a cylinder for annular piston 21b and is provided with a removable end wall 24c which also supports cylinder 22c and forms the lower head for the cylinders of pistons 21b and 22b. Cylinder 22c is provided with an upper head 22d. A cylindrical extension 24c' is provided on piston head 24c of smaller diameter than piston 24b and extends downwardly through base 1a, and this piston extension is suitably sealed by means of the packing ring 24d. A packing ring 24d' surrounding sleeve 24a seals the upper end of the cylinder for ejection piston 24b.

A suitable hydraulic pressure system, not shown, is provided for supplying fluid under pressure to the various cylinders. It will be understood that each cylinder-piston combination is provided with fluid connections leading to both ends of the cylinder through suitable control valves. The connections for cylinder 20b are shown at a and a', while those for the cylinder of annular piston 19a are shown at b and b'. The connections for the ejecting cylinder formed directly in base 1a are represented in dotted lines at c and c'. The connections for operating annular piston 21b are shown at d and d', and those for operating piston 22b are shown at e and e'.

Crosshead 21 is provided with two threaded rods 21c and 21c' which extend downwardly and pass through holes formed in crosshead 24. Suitable lock-nuts 21d and 21d' are carried by these rods above crosshead 24 and cooperate with the crosshead to determine the loading position for the outer plunger 4. Additional lock-nuts 21e and 21e' are carried by these rods below crosshead 24, and these nuts engage crosshead 24 and serve as stops to determine the final position of the outer plunger 4 on the compression stroke.

Connection head 22 supporting inner plunger 6 is provided with lateral extensions which in turn carry threaded rods 25 and 25' which also extend downwardly and pass through holes formed in crosshead 24. These rods carry lock-nuts 25a and 25a' positioned above crosshead 24 and engage the crosshead to determine the position of inner plunger 6 during loading. Additional lock-nuts 25b and 25b' are provided below crosshead 24 for the purpose of fixing or limiting the position of inner plunger 6 at the end of the compression stroke.

Adjustable stops 2a and 2a' carried by table 2 are arranged to cooperate with crosshead 21 and to limit the upward movement of this crosshead on the ejecting stroke. Similar adjustable stops 19b and 19b' carried by crosshead 19 are arranged to engage table 2 and limit the downward movement of the crosshead 19.

An adjustable stop 19c carried by crosshead 19 copoerates with the mounting head 20' for inner plunger 7a to liimt the downward movement of this plunger.

Any suitable loading mechanism may be employed, such as that illustrated in Figure 2, which involves the stationary hopper 17 positioned above the table 2, and a reciprocating feed device 17b is arranged to slide over the upper surface of the table 2 and to transfer a charge of molding material from the lower end of hopper 17 to the cavity in the die 3. The feed device 17b may be reciprocated by any suitable means such as by the hydraulic cylinder 17c shown in Figure 4. It will be understood that this cylinder is controlled in timed relation with the other cylinders to operate the feed device at the proper time in the molding cycle.

Operation of the press shown in Figures 3 and 4 is as follows: It is understood that locknuts 21d, 21d', 25a and 25a' have previously been adjusted so that in the loading position the plungers 4 and 6 are in the relative positions shown in Figure 5a, the crosshead 24 being in its lowermost position. Also, lock-nuts 21e, 21e' 25b and 25b' have been adjusted so that these nuts, by engagement with crosshead 24, will limit the upward movement of plungers 4 and 6 at the end of the compression stroke to the proper positions to fix the final shape of the molded article. With the adjustment shown in Figure 3, the end of inner plunger 6 will be above the end of outer plunger 4 at the end of the compression stroke.

The various valves which control the different hydraulic cylinders may be operated manually to carry out the molding cycle, but the preferred method of operation is to employ a continuously operating cycle controller of known construction for operating the valves in the proper sequence as follows:

After the mold cavity has been filled with molding material the two valves for controlling pistons 19a and 20a are operated to drive upper plungers 7 and 7a downwardly. As soon as these plungers enter the die cavity or bore, the valves controlling pistons 21b and 22b are operated to move lower plungers 4 and 6 upwardly to compress the article into final form. The downward movement of plungers 7 and 7a is limited by stops 19b—19b' and 19c, respectively, while the upward movement of plungers 4 and 6 is limited by adjustable stops 21e—21e' and 25b—25b', respectively. The control valves for the cylinders operating lower plungers 4 and 6 are now cut off so that these plungers will be locked together and will thereafter remain at the same relative levels determined by the final form of the article. The locking of the two plungers in fixed relation follows from the fact that the closing of the control valves traps the operating fluid within the cylinders and thereby locks the two pistons in fixed relation, the operating fluid being incompressible. The valves for the cylinders controlling upper plungers 7 and 7a are next operated to withdraw these plungers from the die cavity, and after they have cleared the die, or after they have moved away from the molded article, the valve controlling ejection piston 24b is operated to drive this piston upwardly, thereby carrying with it pistons 21b and 22b which in turn advance plungers 4 and 6 into the die bore while maintaining the same relative compression levels between these plungers. The upward movement of the ejection piston continues until the end of the lowermost plunger (outer plunger 4) reaches the plane of the upper surface of table 2, the movement being limited by stops 2a and 2a'. Thereafter the valve Vc controlling inner plunger 6 is operated to lower this plunger so that its end is below the end of plunger 4. Following this, the valve controlling the cylinder 17c is operated to move the feed device 17b from under the hopper 17 and into position over the die cavity and at the same time pushes the molded article from the table. While the loading device 17b is in position above the die cavity, the valves controlling pistons 21b, 22b and 24b are operated to return these pistons to their normal position shown in Figure 3 and a new charge of molding material is supplied to the die cavity.

While the invention has been described as applied to presses of the type wherein the lower plungers are operated to eject the molded article from the upper end of the die, it will be obvious that it may be applied to presses of the type wherein two or more upper plungers are operated to eject the molded article from the lower end of the die.

We claim:

1. In a molding press for forming articles of compressed powdered or granular material, the combination of a die having a bore therethrough, a plurality of reciprocable plungers positioned in one end of said bore for forming said articles, means for moving said plungers during compression of said material comprising means for advancing said plungers inwardly of said bore through different distances to compress different portions of said article to different levels, and means for thereafter moving said plungers inwardly of said bore in positively fixed relation to each other to break the frictional lock between said article and the walls of said bore.

2. In a molding press for forming articles of compressed powdered or granular material, the combination of a die table, a die ring mounted in said table, a plurality of plungers positioned in the lower end of the bore of said die ring, means for moving said plungers through different distances inwardly of said bore to effect compression of different portions of said article to different levels, means for thereafter moving said plungers in said bore in fixed relation to each other to initiate ejection of said article from said bore, and means for thereafter moving said plungers to complete the ejection of said article from said bore and to level the ends of said plungers in the plane of the upper face of said table.

3. In a molding press for forming articles of compressed material, the combination of a die, a plurality of independently movable plungers positioned in the lower end of the bore of said die, means for moving said plungers inwardly of said bore to effect compression of said article into final form where the ends of at least two of said plungers are at different levels, and means for ejecting said article from said bore including means for moving said plungers in said bore while maintaining the same relative compression levels of said plungers to initiate the ejection of said article, and means for thereafter leveling the ends of said plungers in the plane of the upper end of said die.

4. In a molding press for forming molded articles, the combination of a die having a vertical bore, a plurality of independently movable plungers positioned in the lower end of said bore, adjustable stops for fixing the die-loading positions of said plungers, means for moving one of said plungers inwardly of said bore to compress a portion of said article to a predetermined level, means for moving another of said plungers inwardly of said bore to compress another portion of said article to a different level, and means for positively advancing both of said plungers in said bore while maintaining the same relative compression levels of said plungers to initiate the ejection of said article from said bore.

5. In a molding press for forming molded articles, the combination of a die having a vertical bore, a plurality of independently movable lower plungers positioned in the lower end of said bore, adjustable stops for fixing the die loading positions of said plungers, an opposing plunger positioned to enter the upper end of said bore, means for forcing said opposing upper plunger into said bore to a predetermined level, means for advancing said lower plungers inwardly of said bore to form said article in final shape with the upper ends of said lower plungers at different levels, means for withdrawing the upper plunger from said bore, and means for thereafter advancing both of said lower plungers inwardly of said bore while maintaining the same relative compression levels of said lower plungers to initiate the ejection of said article from said bore.

6. In a molding press for forming molded articles, the combination of a die having a vertical bore, at least two independently movable plungers positioned in the lower end of said bore, a compression lever having an operating cam, said lever having one arm for advancing one of said plungers in said bore to a predetermined level, and a second arm for advancing the other of said plungers in said bore to a different level for compression of said article into final form, the cam of said compression lever being provided with a raised portion for thereafter advancing both of said plungers into said bore while maintaining the same relative compression levels of said plungers to initiate the ejection of said article from said bore.

7. A combination according to claim 7 and including a cam operated ejection lever having separate arms for advancing said plungers in said bore after initial ejection movement of said article by said compression lever, said ejection lever serving to level the ends of said plungers with the upper face of said die.

8. In a molding press for forming molded articles, the combination of a die having a vertical bore, at least two independently movable plungers positioned in the lower end of said bore, separate hydraulic pistons for advancing said plungers inwardly of said bore to different levels to effect compression of said article into final form, and a third hydraulic piston for thereafter advancing both of said plungers in said bore while maintaining the same relative compression levels of said plungers to initiate the ejection of said article from said bore.

9. A combination according to claim 8 wherein said two first-mentioned hydraulic pistons are carried by said third hydraulic piston.

10. In a molding press for forming articles of compressed material, the combination of a die having a vertical bore, a plurality of independently movable plungers positioned in the lower end of the bore of said die, means for moving said plungers inwardly of said bore to effect compression of said article into final form where the ends of at least two of said plungers are at different levels, and means for ejecting said article from said bore including means for moving said plungers in said bore while maintaining the same relative compression levels of said plungers to initiate the ejection of said article and to raise said plungers in fixed relative positions until the end of the lowermost plunger is in the plane of the upper end of said die and at least one plunger projects above said die, and means for thereafter lowering said projecting plunger to the plane of the upper end of said die while maintaining said lowermost plunger level with the end of said die.

11. In a molding press for forming articles of compressed powdered or granular material, the combination of a die having a vertical bore, a pair of independently movable plungers positioned in the lower end of said bore with the ends of said plungers normally at different levels, means for raising the lowermost plunger, means rendered effective when said lowermost plunger reaches a predetermined level for interlocking said plungers for simultaneous movement in fixed relation, means for continuing the movement of said interlocked plungers to compress said article into final shape, and means for thereafter moving said interlocked plungers in the same direction to break the frictional lock between said article and the walls of said bore and to initiate the ejection of said article from said bore.

FRANCIS J. STOKES, Jr.
LAWRENCE H. BAILEY.

REFERENCES CITED

The following references are of record in the file of this patent:

UNITED STATES PATENTS

| Number | Name | Date |
| --- | --- | --- |
| 1,648,721 | Claus | Nov. 8, 1927 |
| 2,325,687 | Kux | Aug. 3, 1943 |

Certificate of Correction

Patent No. 2,499,980

March 7, 1950

FRANCIS J. STOKES, Jr., ET AL.

It is hereby certified that errors appear in the printed specification of the above numbered patent requiring correction as follows:

Column 4, line 39, for "abutments 13a" read *abutments 13a'*; column 6, line 69, after "21e'" insert a comma; column 9, line 13, for the claim reference numeral "7" read *6*;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*